United States Patent
Ufondu et al.

(10) Patent No.: US 10,619,474 B2
(45) Date of Patent: Apr. 14, 2020

(54) REMOTELY OPERATED INFLOW CONTROL VALVE

(71) Applicant: Saudi Arabian Oil Company, Dhahran (SA)

(72) Inventors: Kenechukwu Okezie Ufondu, Dhahran (SA); Auda K. Al-Dulaijan, Dhahran (SA); Ali A. Al-Hajji, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 186 days.

(21) Appl. No.: 15/812,412

(22) Filed: Nov. 14, 2017

(65) Prior Publication Data

US 2019/0145248 A1 May 16, 2019

(51) Int. Cl.
*E21B 47/12* (2012.01)
*E21B 43/14* (2006.01)
(Continued)

(52) U.S. Cl.
CPC ............ *E21B 47/12* (2013.01); *E21B 34/066* (2013.01); *E21B 43/12* (2013.01); *E21B 43/14* (2013.01);
(Continued)

(58) Field of Classification Search
CPC ........ E21B 47/12; E21B 47/124; E21B 43/14; E21B 34/066; E21B 47/065; E21B 43/12;
(Continued)

(56) References Cited

U.S. PATENT DOCUMENTS 6,808,630 B2   10/2004 Yang
8,145,427 B1   3/2012 Saleri et al.
(Continued)

FOREIGN PATENT DOCUMENTS

EP   2483510 A2   8/2012
WO   0165063 A1   9/2001
(Continued)

OTHER PUBLICATIONS

Naldrett et al. "Wireless wellbore solutions" www.oedigital.com; retrieved from http://www.oedigital.com/production/workover/item/416-wireless-wellbore-solutions?tmpl=component&print=1; Sep. 1, 2011.

(Continued)

*Primary Examiner* — Michael R Wills, III
(74) *Attorney, Agent, or Firm* — Bracewell LLP; Constance G. Rhebergen; Ryan B. McBeth

(57) ABSTRACT

Embodiments of systems and methods for advanced inflow control valve systems is provided. Multiple micro-computer integrated downhole inflow control valves can be configured as part of an inflow control valve control system. Inflow control valves of the described system can be configured to include a micro-computer system configured with a micro-computer circuit board comprising a processor, memory, nonvolatile memory, networking capability, wireless communications channels, and software. The software can include an operating system, a communications interface program, and a program for inflow control valve control and monitoring functions. In an embodiment, each inflow control valve can be assigned an internet IP address. Inflow control valves configured to include micro-computer systems can be modified and programmed with smart device style configurations to be able to remotely communicate with devices residing at the surface and to offsite locations via its network interface and graphical end user interfaces such as website or mobile phone applications.

18 Claims, 3 Drawing Sheets

(51) Int. Cl.
  *E21B 43/12* (2006.01)
  *E21B 47/06* (2012.01)
  *E21B 34/06* (2006.01)
  *G05D 7/06* (2006.01)
  *E21B 34/00* (2006.01)

(52) U.S. Cl.
  CPC ......... *E21B 47/065* (2013.01); *G05D 7/0676* (2013.01); *E21B 2034/007* (2013.01)

(58) Field of Classification Search
  CPC ...... E21B 2034/007; E21B 2041/0028; G05D 7/0676
  See application file for complete search history.

(56) References Cited

U.S. PATENT DOCUMENTS

| | | |
|---|---|---|
| 8,358,220 B2 | 1/2013 | Savage |
| 8,708,050 B2 | 4/2014 | Dykstra et al. |
| 8,996,449 B2 | 3/2015 | Power et al. |
| 9,049,821 B1 | 6/2015 | Hanna |
| 9,291,032 B2 | 3/2016 | Greci |
| 9,341,557 B2 | 5/2016 | Banian et al. |
| 2002/0020533 A1* | 2/2002 | Tubel .................. E21B 34/066 166/313 |
| 2004/0128033 A1 | 7/2004 | Ku et al. |
| 2005/0194182 A1* | 9/2005 | Rodney ................ E21B 47/12 175/24 |
| 2011/0180267 A1 | 7/2011 | Wildman et al. |
| 2012/0085434 A1 | 4/2012 | Powanda |
| 2014/0216754 A1 | 8/2014 | Richard et al. |
| 2014/0277672 A1 | 9/2014 | Manzarek et al. |
| 2014/0352956 A1 | 12/2014 | Hallundbæk |
| 2015/0275656 A1* | 10/2015 | Holt ..................... E21B 44/00 340/855.4 |
| 2016/0003035 A1* | 1/2016 | Logan ................... E21B 47/12 340/854.6 |
| 2016/0170417 A1 | 6/2016 | Sun et al. |

FOREIGN PATENT DOCUMENTS

| | | |
|---|---|---|
| WO | 2008070271 A2 | 6/2008 |
| WO | 2016073673 A1 | 5/2016 |
| WO | 2016094192 A1 | 6/2016 |
| WO | 2017058258 A1 | 4/2017 |

OTHER PUBLICATIONS

The International Search Report and Written Opinion for related PCT application PCT/US2018/056937 dated Feb. 14, 2019. (SA5706).

* cited by examiner

REMOTELY OPERATED INFLOW CONTROL VALVE

FIELD OF THE INVENTION

Embodiments of the present disclosure relate to oil & gas downhole inflow control valves and inflow control valve control systems.

BACKGROUND OF THE INVENTION

Inflow control valves have been deployed and utilized to choke and prioritize flow of hydrocarbons and other fluids in downhole well environments for some time. It is common in well installations for multiple separate inflow control valves to be deployed underground as part of a downhole well system. In some systems, inflow control valves can be arranged and deployed to particular locations in a well with the plan of establishing specific flow patterns for the well they are deployed in. Inflow control valves can be mechanically configured to limit flow for hydrocarbons and other fluid passing through them at a particular location. By limiting flow, particular sections of a well may be restricted or choked, thereby providing less overall fluid to the production of a given well. This technique can be used for various reasons, for example, it may be desirous to restrict or choke flow from a particular well section that has a higher water content or water cut than another section of the same well. By planning for desired flow patterns and deploying inflow control valves into particular locations in a well, production fluid hydrocarbon and water content can be more closely controlled.

There is a present need in the well industry for advanced control, monitoring, and logging methods that can reliably and accurately control, monitor, and log data from inflow control valve systems at a particular wellsite.

Prior technology in the area of controlling inflow control valves often relies on direct-wire connections, such as with umbilicals and conduits, to each of the individual inflow control valves that has been deployed as part of a well control system. It would further be desirable to have a system that was designed towards utilizing wireless technology to control downhole inflow control valves. Prior inflow control valve systems have also been known to rely on pulse telemetry for communicating control messages and alternatively, prior inflow control valve systems have also been known to take changes into account regarding reservoir fluid characteristics to then control the inflow control valves that are configured in the system.

The current use of a physical conduit along with an umbilical electrical connection, and the number of such conduits and umbilicals that can be stuffed through typical flow through packers limits the number of inflow control valves that can be deployed in a given well environment.

A new inflow control valve technology and framework is thus desired that will allow for numerous inflow control valves to be deployed in a particular well environment such that each control valve can be controlled, which would allow for an incredible control granularity for a particular well and for precise flow control between compartmentalized well sections.

It would also be desirable for power delivery to downhole inflow control valves that are deployed as part of a system be through a self-powered smart sub assembly that can be configured and deployed as part of the downhole valves systems deployed at a particular wellsite.

SUMMARY OF THE INVENTION

Embodiments of the present disclosure aim to provide advanced oil & gas downhole inflow control valves and inflow control valve control systems.

According to an embodiment, a system is provided and configured with multiple downhole inflow control valves as well as a framework for an inflow control valve control system. In a particular embodiment, inflow control valves in the described system are configured with a micro-computer system, that can be configured with a micro-computer circuit board comprising a processor, memory, networking capability, and software (collectively the micro-computer system). The software can include an operating system and communications interface program. In an embodiment, each inflow control valve can be assigned an internet IPv6 IP address. Inflow control valves configured with micro-computer systems can be modified and programmed with smart device style configurations to be able to remotely communicate with devices residing at the surface and to offsite locations via its network interface.

Such an inflow control valve system solves the technical problem of prior art designs and configurations that were limited to a specific number of downhole inflow control valves that could be installed at a given wellsite.

For installations where wireless communications are possible, a micro-computer inflow control valve system can wirelessly communicate to the surface without the need to run umbilicals that would typically be configured for power and wired communication channels. A battery pack or multiple battery packs can be used to power a micro-computer inflow control valve system where it is desirable to deploy the system without umbilical connections. Other power sources may also be used such as inductive coupling devices and/or devices that may allow for the running of electrical or fiber optic cables to the surface that would provide for a means of power for configured inflow control valves.

Umbilicals can be and are often damaged during make up and deployment, so the wireless communication style embodiment can lead to more runtime and less maintenance issues at deployment and otherwise.

Such a system also has the capacity to run a much larger number of inflow control valves at a given wellsite for maximum reservoir contact ("MRC") and extreme reservoir contact ("ERC") reservoir exploitation techniques.

In an embodiment, inflow control valves can be configured with unique IP addresses and further configured as part of a virtual server system using a DynDNS address and router system. This allows remote and wireless actuation of inflow control valves from the surface, or from a website or a mobile phone application from anywhere in the world with internet access. Additionally, sensors can be configured as part of or connected into the micro-computer system configured as part of the inflow control valve. For example, downhole temperature can be observed, logged, and relayed via the IPv6 network communications channel of the inflow control valve. This could be useful when temperature observations may be valuable in determining the downhole characteristics of a particular wellbore or wellsite. Further, other sensors could be configured to determine the state of the inflow control valve hardware. For example, if a particular inflow control valve is no longer operational or functional in some manner, this information can be shared with the surface and to other remote sites via the micro-computer network communications channels.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
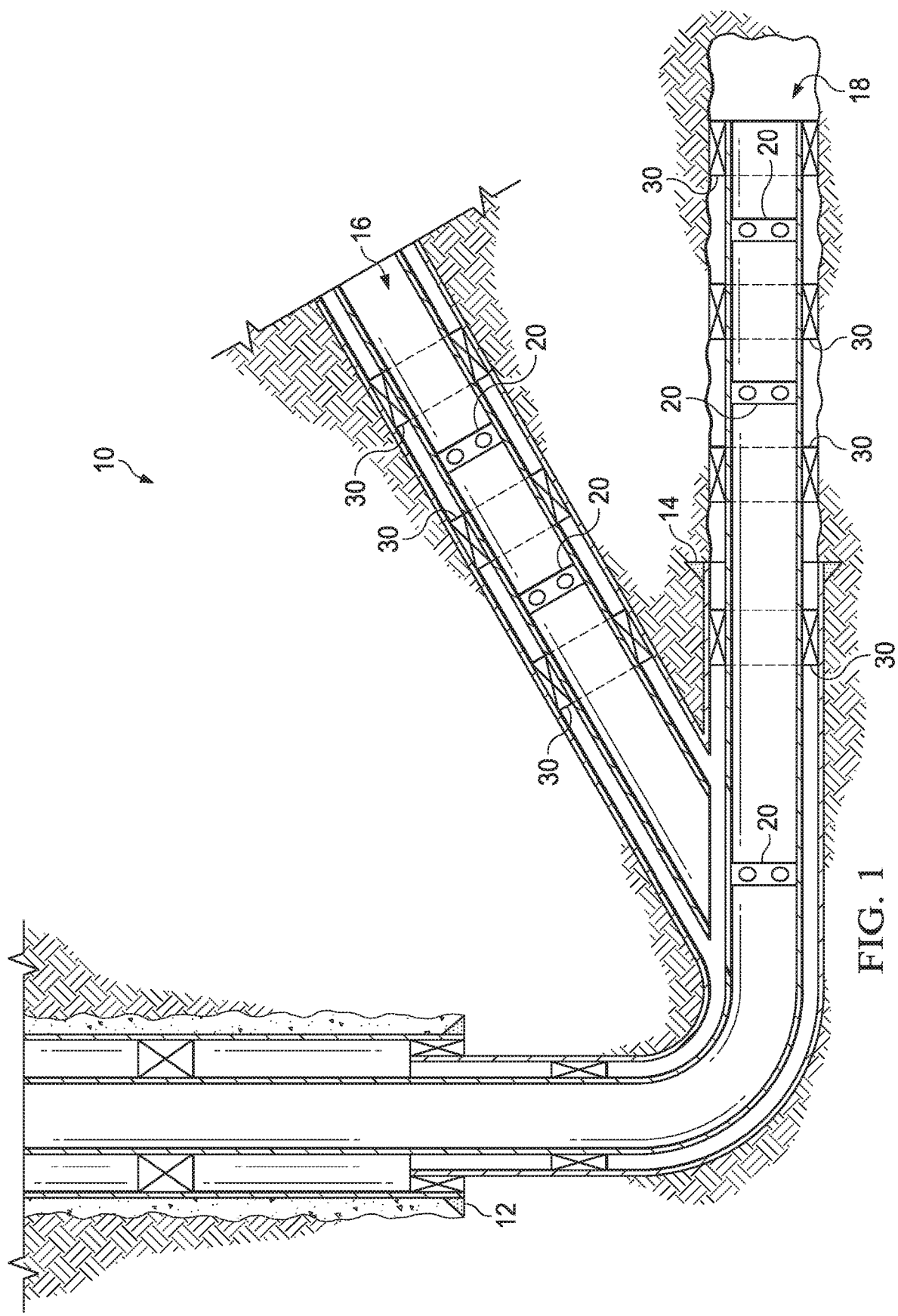
FIG. 1 illustrates a side cross-sectional view of an example wellbore configured with one possible arrangement and configuration of an inflow control valve micro-computer system.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

Embodiments of the present disclosure aim to provide advanced oil & gas downhole inflow control valves and inflow control valve control systems. According to an embodiment, and as illustrated in reference to FIG. 1, in a downhole wellbore 10, a system is provided and configured with multiple downhole inflow control valves 20. FIG. 1. Illustrates an example layout of a particular wellbore 10, having a casing 12, liner 14, first leg 16, and second leg 18. Packers 30 are also shown configured in various portions of the wellbore. Each of these features, may be configured differently or organized differently at a particular wellsite. As such, the layout of FIG. 1, should be viewed as merely one example since wellsites and wellbores each have unique layouts and configurations.

Figure 2:
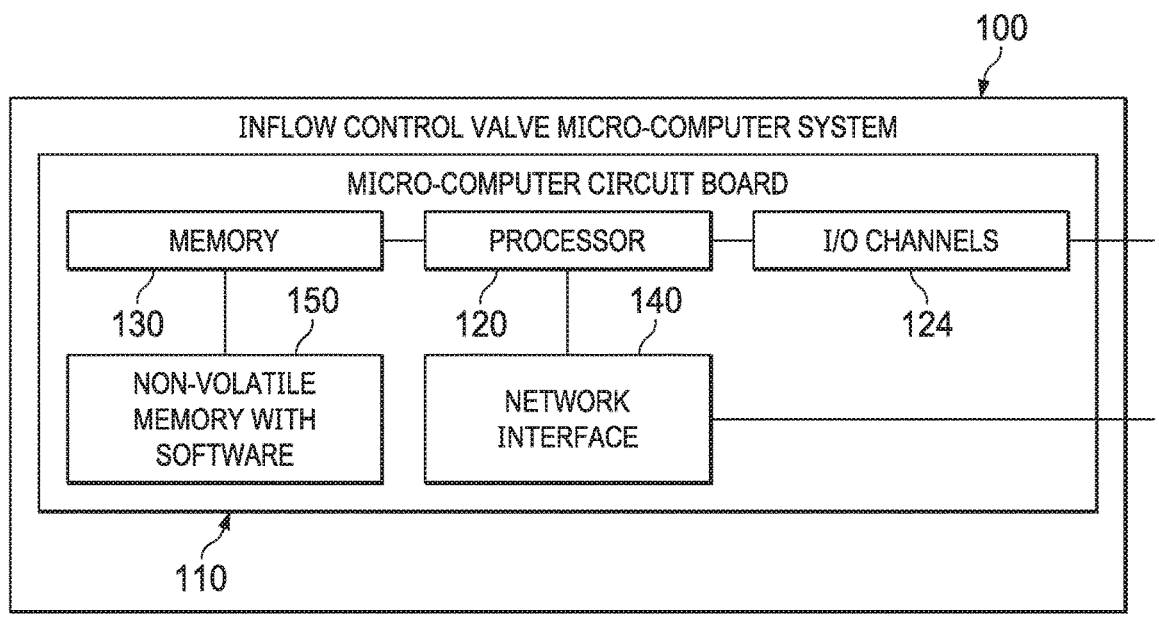
FIG. 2 illustrates a block diagram showing one possible configuration of an inflow control valve micro-computer system.

In a particular embodiment, such as that shown in FIG. 1, inflow control valves 20 can each be configured with an inflow control valve micro-computer system 100 such as that illustrated by the block diagram of FIG. 2. Again referring to FIG. 2, an inflow control valve micro-computer system 100 can be configured with a micro-computer circuit board 110 comprising a processor 120, I/O (input/output) channels 124, memory 130, a network interface 140, and non-volatile memory with loaded software 150 (collectively the micro-computer system). The software can include an operating system, communications interface program, and inflow control valve control and/or monitoring program. In an alternative embodiment these programs may be combined and/or run on the bare system without an operating system.

In an embodiment, each inflow control valve that is part of the system can be assigned an internet IPv6 IP address. Such an inflow control valves configured with a micro-computer system can be modified and programmed with smart device style features and configurations. In an embodiment, the inflow control valve system can be connected to or configured with wireless communications equipment to be able to remotely communicate with devices residing at the surface and to offsite locations via a configured network interface.

Figure 3:
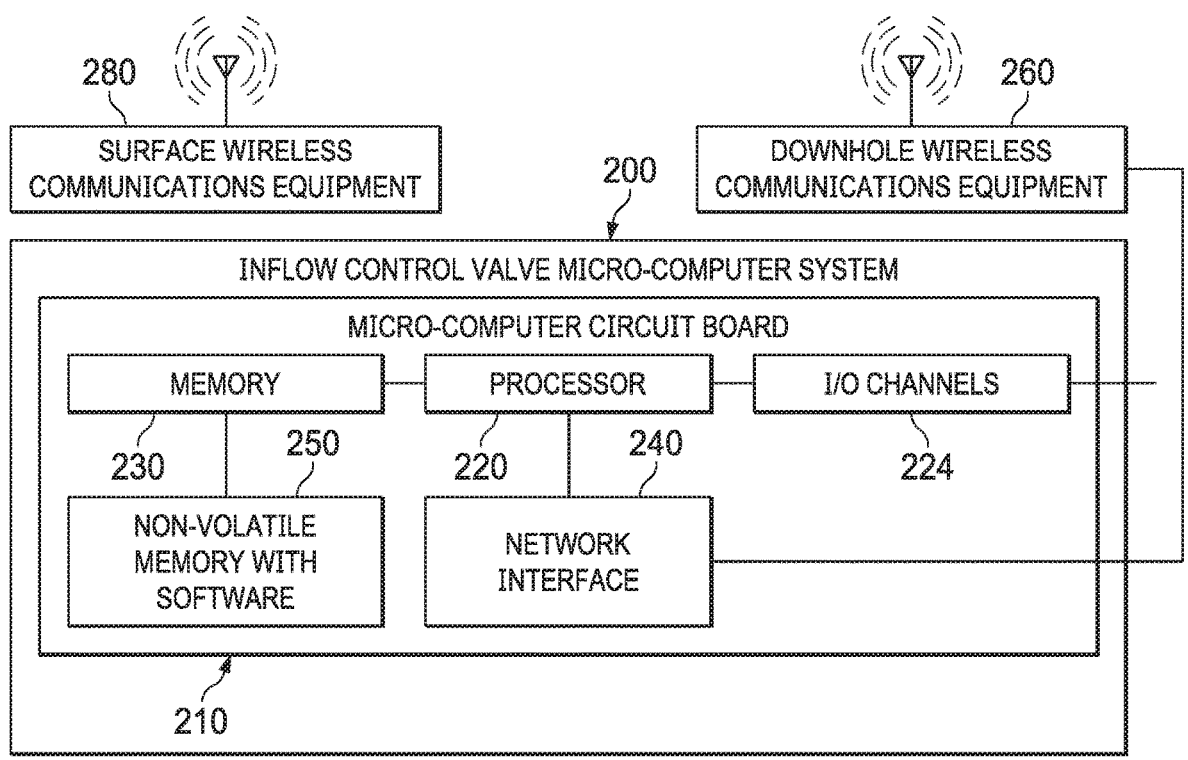
FIG. 3 illustrates a block diagram showing one possible configuration of an inflow control valve micro-computer system configured alongside wireless communications equipment.

Referring to FIG. 3, a block diagram illustrating an embodiment of an inflow control valve micro-computer system 200 configured alongside wireless communications equipment 260 is shown. Similarly to the system illustrated in FIG. 2 and FIGS. 4-5, this system can be configured with a micro-computer circuit board 210 comprising a processor 220, I/O (input/output) channels 224, memory 230, a network interface 240, and non-volatile memory with loaded software 250 (collectively the micro-computer system). In this embodiment, the network interface 240 has an ethernet communications connection with the wireless communications equipment 260 that sends and receives information to wireless communications equipment at the surface of the wellsite 280.

Figure 4:
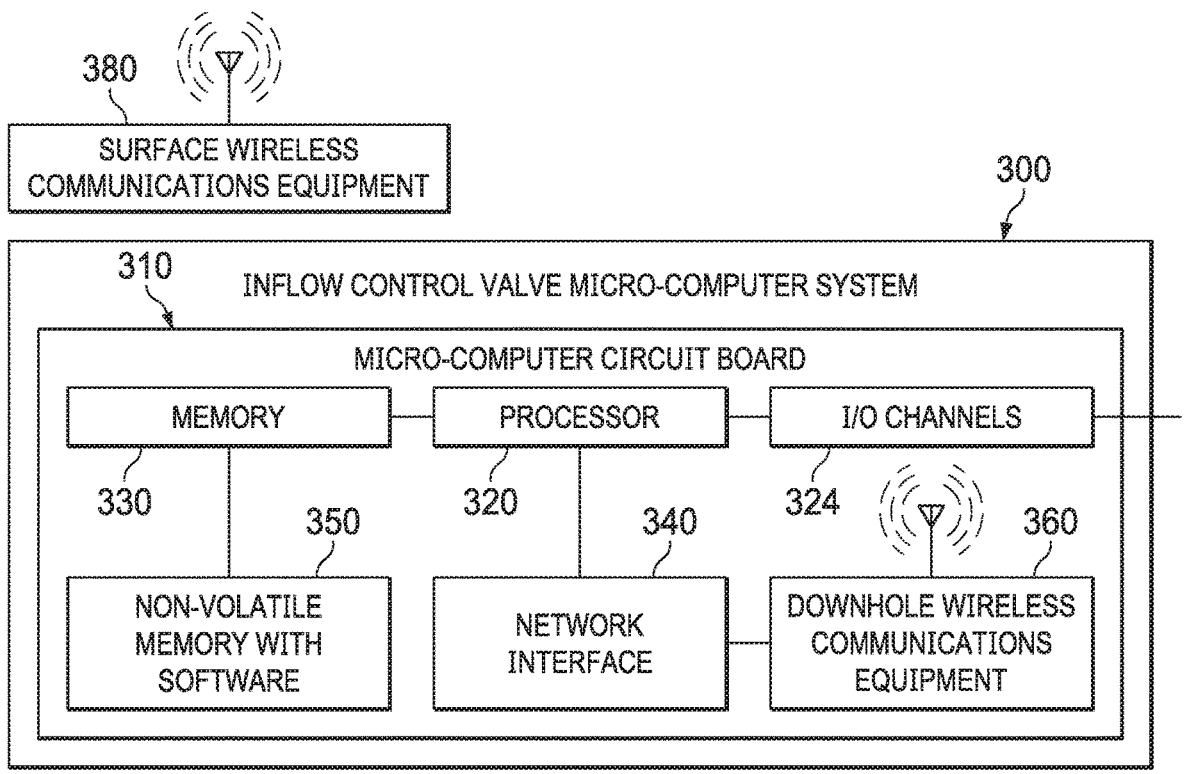
FIG. 4 illustrates a block diagram showing one possible configuration of an inflow control valve micro-computer system configured with integrated wireless communications equipment.

Referring to FIG. 4, a block diagram illustrating an embodiment of an inflow control valve micro-computer system 300 configured with integrated wireless communications equipment 360 is shown. Similarly to the system illustrated in FIGS. 2-3 and FIG. 5, this system can be configured with a micro-computer circuit board 310 comprising a processor 320, I/O (input/output) channels 324, memory 330, a network interface 340, and non-volatile memory with loaded software 350 (collectively the micro-computer system). In this embodiment, the network interface 340 and integrated wireless communications equipment 360 sends and receives information to wireless communications equipment at the surface of the wellsite 380. In an embodiment the integrated wireless communications equipment may include a signal amplifier and an antenna to send and receive signals to the surface.

Figure 5:
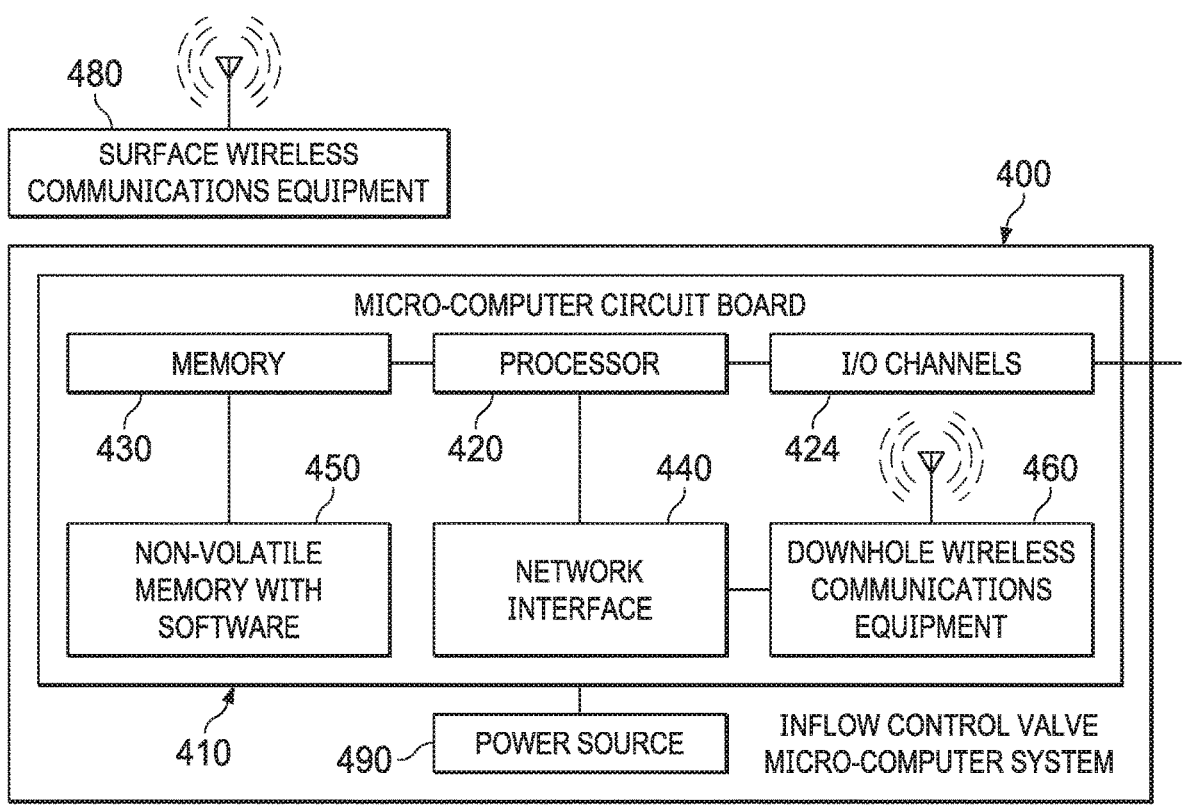
FIG. 5 illustrates a block diagram showing one possible configuration of an inflow control valve micro-computer system configured with an integrated power source.

Referring to FIG. 5, a block diagram illustrating an embodiment of an inflow control valve micro-computer system 400 configured with an integrated power source 490 is shown. Similarly to the system illustrated in FIGS. 2-4, this system can be configured with a micro-computer circuit board 410 comprising a processor 420, I/O (input/output)

channels 424, memory 430, a network interface 440, and non-volatile memory with loaded software 450 (collectively the micro-computer system). In an embodiment, a battery or inductive coupling device may be configured as the power source 490 illustrated in this figure. In an alternate embodiment, a hard electrical power line such as an electrical conducting line or a fiber optic line may be configured and utilized to supply power to the inflow control valve micro-computer system 400.

In an embodiment, inflow control valves can be configured with unique IP addresses and further configured as part of a virtual server system using a DynDNS address and router system. Any of the embodiments described herein can be configured to allow remote and wireless actuation or choking of inflow control valves from the surface or using website or mobile phone application from anywhere in the world with internet access. Specifically, the I/O channels of the micro-computer systems described herein, and in relation to FIGS. 1-5, can be configured to be connected to electronic controlled electronic or hydraulic actuation/choking unites for configured inflow control valves. I/O channels may also be configured to connect to any number of sensors, such as temperature sensors or other sensors, and may provide data that is useful to monitor in a given downhole environment. Additionally, sensors can be configured as part of or connected into the micro-computer system configured as part of the inflow control valve. In an embodiment, downhole temperature can be observed via a configured temperature system that outputs temperature values to the configured micro-computer system. This data can then be logged and relayed via the IPv6 network communications channel of the inflow control valve to the surface.

Additionally, in an embodiment, should a remote user want to know a sensor value or a remote inflow control valve choking or actuation state, a user can log in to a website portal that communicates with an inflow control valve via its IP communication channels. Or in an alternative embodiment a user may go to a website directly hosted by the micro-computer system of the inflow control valve to check a sensor value or to check the choking or actuation state of the particular inflow control valve. In an embodiment, an inflow control valve can similarly be configured to communicate with a mobile device through a mobile device application or "app" either directly or via a remote server that interfaces with the inflow control valve. Temperature sensors configured in conjunction with inflow control valves may be useful when temperature observations may be valuable in determining the downhole characteristics of a particular wellbore or wellsite. Further, other sensors could be configured to determine the state of the inflow control valve hardware. For example, in an embodiment, if a particular inflow control valve is no longer operational or functional in some manner, this information can be shared with the surface and to other remote sites via the micro-computer network communications channels.

Inflow Control Valves are devices that are used in intelligent completions operations of oil producing wells to enhance oil recovery while reducing water and gas production to the surface.

The capacity to install inflow control valves in prior systems has been limited by the number of umbilicals (hydraulic and/or electrical) that can be successfully deployed through flow through packers and physically down to the valves. This can be a functional limitation for a given wellsite in that the number of valves that might possibly be configured with umbilicals may be less than the optimal number of valves that might be deployed and utilized for the wellsite. In an embodiment, the micro-computer control inflow control valves configured with wireless communications capabilities described herein, do not suffer such a limitation and may be deployed in numbers that are significantly greater and not limiting for a particular wellsite.

In an embodiment, where some micro-computer configured inflow control valves may be installed at depths such that wireless communication all the way to the surface may not be possible, wireless repeater devices can be installed in a drill string or as part of other micro-computer configured inflow control valves that are deployed as part of a system. In an embodiment, the wireless repeater devices can be configured to relay the wireless communication messages of other micro-computer configured inflow control valves that are installed at deeper depths or beneath a geological formation that may not allow communication all the way to the surface. By deploying a system that has the capability to repeat and/or relay the wireless communications from other configured micro-computer configured inflow control valves, the system described herein can achieve larger footprints and greater use at a particular wellsite where direct-to-surface wireless communications may not be achievable otherwise.

An Internet Protocol (IP) address is unique on the internet at any given time. For each Smart Device to connect to the internet, it requires its unique IP address or a connection to a router with a unique IP address. In an embodiment, the micro-computer configured inflow control valves described herein can either be configured with unique IP addresses or a local network IP address with access to a router configured at a given wellsite. In an embodiment where a router is configured, a table of IP addresses for each inflow control valve can be stored in the router such that an end user with internet access can access the router to communicate with a given downhole inflow control valve configured to be in communication with the router. This will allow the inflow control valves described herein to be controlled from anywhere around the globe without the requirement of either hydraulic and or electrical umbilicals connections to the inflow control valves, which as described previously can be limiting. One such limitation is that umbilicals are often damaged during make up and or deployment. A wireless system would not have these same issues as this same structure simply wouldn't be there to damage.

Micro-computer based inflow control valve systems also allow for the possibility of infinite number of inflow control valves for Maximum reservoir Contact (MRC) and Extreme Reservoir Contact (ERC) reservoir exploitation techniques.

In an embodiment, power delivery to a downhole micro-computer inflow control valve system can be through a self-powered smart sub assembly that will be part of the inflow control valve. Such a smart sub assembly may include battery power or the generation of power (such as from fluid flow) or both.

In an embodiment, power delivery to a downhole micro-computer inflow control valve system can be through an inductive coupling device configured as part of the assembly. In an alternate embodiment the inductive coupling device may be located away from the assembly and an electrical wire can be run from the device to the downhole micro-computer inflow control valve system.

In an embodiment, safeguards may be put in place against potential interference with the access, control and manipulation operation of the micro-computer based inflow control valves and accompanying systems, servers, websites, etc.

Password protection and encrypted communication can be configured such that access can be controlled to these systems.

From the description provided above, numerous different embodiments of the invention including software are envisioned that can be combined with general purpose hardware. A computer system can be created with various components to carry out the methods of the various embodiments including a non-transitory computer readable medium that can contain instructions for a software program to implement the method of the embodiments.

The above disclosure is meant to be illustrative of the various embodiments of the present invention. Various modifications will become apparent to those skilled in the art once the disclosure is considered as a whole.

The invention claimed is:

1. A micro-computer based inflow control valve comprising:
 an electronically actuatable inflow control valve;
 a micro-computer system configured alongside the electronically actuatable inflow control valve, the micro-computer system further comprising:
  a micro-computer circuit board,
  a microprocessor configured on the micro-computer circuit board, the microprocessor configured with input/output channels,
  memory configured to be in communication with the microprocessor,
  a data bus extending between the memory and the microprocessor,
  a network interface configured to be in communication with the microprocessor;
  non-volatile memory configured to be in communication with the microprocessor;
  a wireless communication channel configured to be in communication with the network interface;
  the network interface of the micro-computer based inflow control valve is configured with an IP address and connected to the internet through a router; and
  a software program stored on the nonvolatile memory that enables the micro-processor to communicate to a wireless communication hub at the surface via the network interface and connected wireless communication channel of the micro-computer system, the software further configured to receive control commands from the wireless communication hub at the surface that instruct the micro-computer system to actuate the configured electrically actuatable inflow control valve.

2. The micro-computer based inflow control valve of claim 1 wherein the system is powered by a battery configured as part of the inflow control valve assembly.

3. The micro-computer based inflow control valve of claim 1 wherein the system is connected to and powered by a battery configured as part of a smart sub assembly deployed in general proximity to the inflow control valve.

4. The micro-computer based inflow control valve of claim 1 wherein the electronically actuatable inflow control valve has multiple actuation states such that the valve can choke the flow path it is controlling to varying degrees.

5. The micro-computer based inflow control valve of claim 1 wherein the micro-computer based inflow control valve further comprises one or more sensors to monitor the downhole conditions in proximity of the micro-computer based inflow control valve.

6. The micro-computer based inflow control valve of claim 5, wherein at least one of the one or more sensors is a temperature probe to monitor downhole temperatures in proximity of the micro-computer based inflow control valve.

7. A micro-computer based inflow control valve system configured at a wellsite comprising:
 two or more micro-computer based inflow control valves, each control valve comprising:
  an electronically actuatable inflow control valve;
  a micro-computer system configured alongside the electronically actuatable inflow control valve, the micro-computer system further comprising:
   a micro-computer circuit board,
   a microprocessor configured on the micro-computer circuit board, the microprocessor configured with input/output channels,
   memory configured to be in communication with the microprocessor,
   a data bus extending between the memory and the microprocessor,
   a network interface configured to be in communication with the microprocessor;
   non-volatile memory configured to be in communication with the microprocessor;
   a wireless communication channel configured to be in communication with the network interface;
   the network interface of the micro-computer based inflow control valve is configured with an IP address and connected to the internet through a router; and
   a software program stored on the nonvolatile memory that enables the micro-processor to communicate to a wireless communication hub at the surface via the network interface and connected wireless communication channel of the micro-computer system, the software further configured to receive control commands from the wireless communication hub at the surface that instruct the micro-computer system to actuate the configured electrically actuatable inflow control valve.

8. The micro-computer based inflow control valve of claim 7 wherein the system is powered by an inductive coupling device configured as part of the inflow control valve assembly.

9. The micro-computer based inflow control valve of claim 7 wherein the system is connected to and powered by a battery configured as part of a smart sub assembly deployed in general proximity to the inflow control valve.

10. The micro-computer based inflow control valve of claim 7 wherein the electronically actuatable inflow control valve has multiple actuation states such that the valve can choke the flow path it is controlling to varying degrees.

11. The micro-computer based inflow control valve of claim 7 wherein the micro-computer based inflow control valve further comprises one or more sensors to monitor the downhole conditions in proximity of the micro-computer based inflow control valve.

12. The micro-computer based inflow control valve of claim 11, wherein at least one of the one or more sensors is a temperature probe to monitor downhole temperatures in proximity of the micro-computer based inflow control valve.

13. A method of remotely managing a micro-computer based inflow control valve, comprising the following steps:
 deploying a micro-computer based inflow control valve at a wellsite, the micro-computer based inflow control valve comprising:
  an electronically actuatable inflow control valve;

a micro-computer system configured alongside the electronically actuatable inflow control valve, the micro-computer system further comprising:
a micro-computer circuit board,
a microprocessor configured on the micro-computer circuit board, the microprocessor configured with input/output channels,
memory configured to be in communication with the microprocessor,
a data bus extending between the memory and the microprocessor,
a network interface configured to be in communication with the microprocessor;
non-volatile memory configured to be in communication with the microprocessor;
a wireless communication channel configured to be in communication with the network interface;
the network interface of the micro-computer based inflow control valve is configured with an IP address and connected to the internet through a router; and
a software program stored on the nonvolatile memory that enables the micro-processor to communicate to a wireless communication hub at the surface via the network interface and connected wireless communication channel of the micro-computer system, the software further configured to receive control commands from the wireless communication hub at the surface that instruct the micro-computer system to actuate the configured electrically actuatable inflow control valve,
configuring the network interface of the micro-computer based inflow control valve with an IP address and providing a router connection to the internet to the inflow control valve via a router at the surface,
remotely accessing the micro-computer based inflow control valve through a remote and secure internet connection,
monitoring the actuation status of the micro-computer based inflow control valve via the remote and secure internet connection, and
controlling the actuation of the electronically actuatable inflow control valve via the remote and secure internet connection.

14. The micro-computer based inflow control valve of claim 13 wherein the system is powered by a battery configured as part of the inflow control valve assembly.

15. The micro-computer based inflow control valve of claim 13 wherein the system is connected to and powered by a battery configured as part of a smart sub assembly deployed in general proximity to the inflow control valve.

16. The micro-computer based inflow control valve of claim 13 wherein the electronically actuatable inflow control valve has multiple actuation states such that the valve can choke the flow path it is controlling to varying degrees.

17. The micro-computer based inflow control valve of claim 13 wherein the micro-computer based inflow control valve further comprises one or more sensors to monitor the downhole conditions in proximity of the micro-computer based inflow control valve.

18. The micro-computer based inflow control valve of claim 17, wherein at least one of the one or more sensors is a temperature probe to monitor downhole temperatures in proximity of the micro-computer based inflow control valve.

* * * * *